United States Patent [19]

Garkisch et al.

[11] 4,135,974
[45] Jan. 23, 1979

[54] NUCLEAR CORE POSITIONING SYSTEM

[75] Inventors: Hans D. Garkisch, Irwin; Howard W. Yant, Greensburg; John F. Patterson, Murrysville, all of Pa.

[73] Assignee: Westinghouse Electric Corp., Pittsburgh, Pa.

[21] Appl. No.: 471,068

[22] Filed: May 17, 1974

Related U.S. Application Data

[63] Continuation of Ser. No. 210,447, Dec. 21, 1971, now Defensive Publication No. T911,015.

[51] Int. Cl.² .......................... G21C 9/00; G21C 19/00
[52] U.S. Cl. .......................................... 176/87; 176/78; 176/85
[58] Field of Search .................. 176/85, 87, 40, 75, 176/77, 78

[56] References Cited

U.S. PATENT DOCUMENTS

| | | | |
|---|---|---|---|
| 2,838,451 | 6/1958 | Long et al. | 204/193.2 |
| 3,549,493 | 12/1970 | Germer | 176/18 |
| 3,607,637 | 9/1971 | Marshall | 176/61 |
| 3,627,634 | 12/1971 | Guenther | 176/58 |
| 3,629,070 | 12/1971 | Stankiewicz | 176/87 |
| 3,682,774 | 8/1972 | Beyer | 176/87 |

*Primary Examiner*—Stephen C. Bentley
*Assistant Examiner*—Ralph Palo
*Attorney, Agent, or Firm*—Edward L. Levine; Z. L. Dermer

[57] ABSTRACT

A structural support system for the core of a nuclear reactor which achieves relatively restricted clearances at operating conditions and yet allows sufficient clearance between fuel assemblies at refueling temperatures. Axially displaced spacer pads having variable between pad spacing and a temperature compensated radial restraint system are utilized to maintain clearances between the fuel elements. The core support plates are constructed of metals specially chosen such that differential thermal expansion produces positive restraint at operating temperatures.

6 Claims, 4 Drawing Figures

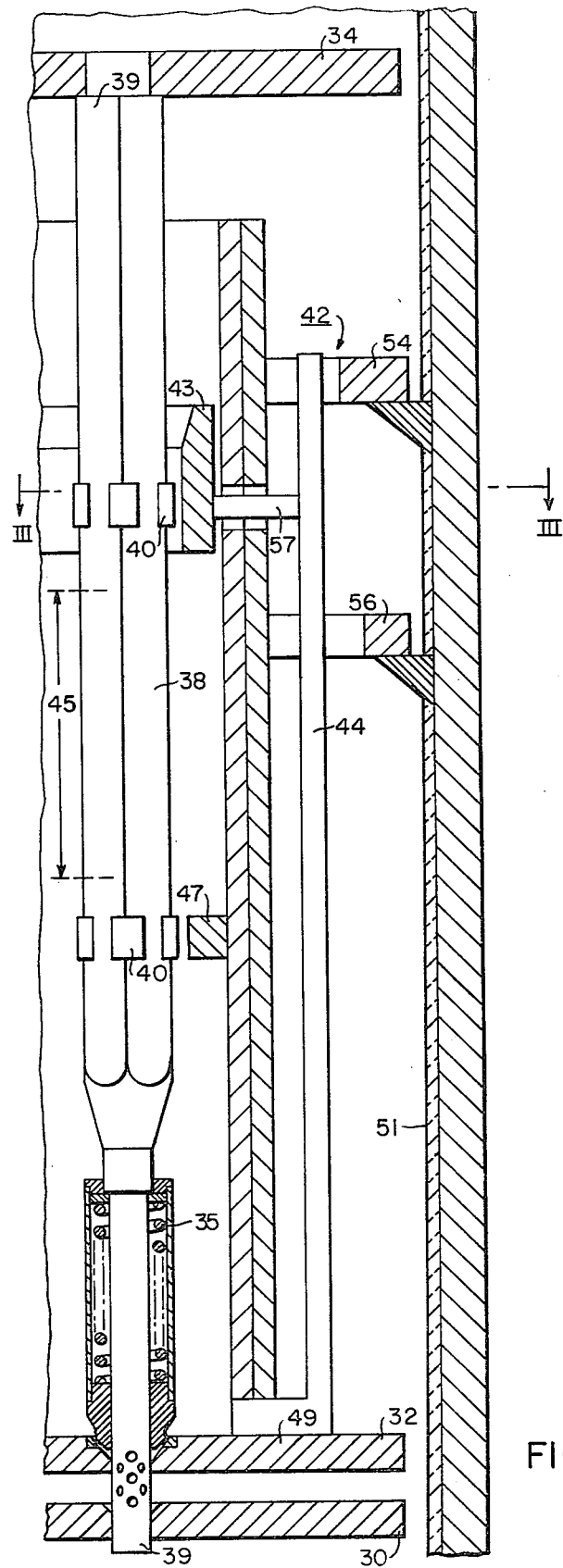
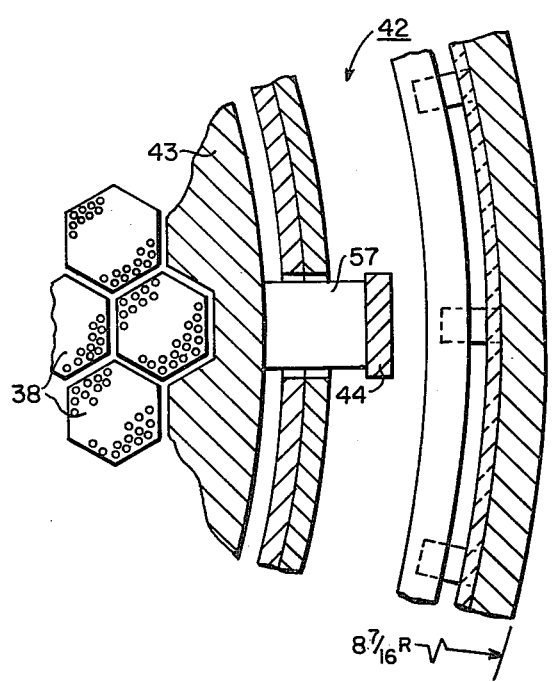
FIG. 2
FIG. 3

NUCLEAR CORE POSITIONING SYSTEM

This is a continuation, of application Ser. No. 210,447 filed Dec. 21, 1971, now Defensive Publication No. T 911,015.

BACKGROUND OF THE INVENTION

This invention pertains to structural support systems for the core of a nuclear reactor and more particularly to such support systems which are subject to both thermal perturbations and radiation induced swelling; as with liquid metal fast breeder reactors (LMFBR).

The primary restraint on the design of the core support system for an LMFBR is that the system must accurately and predictably position the fuel assemblies while causing a negative overall power coefficient of reactivity. Such a design is particularly difficult to achieve since thermal perturbations and radiation induced swelling constantly change the positional relationship of the structural elements.

The prior art basically discloses two contrasting approaches to this problem. The first approach features a relatively loose core, to wit, one in which the fuel assemblies are allowed to bow and other structural elements are allowed to freely change their positional relationship. The operating characteristics of the reactor are then predictable on the basis of the ultimate positional relationship of the elements at operating temperature. The EBR-II nuclear reactor is an example of this approach. The second approach features a tight core which restricts bowing, of which Fermi is an example. However, these present designs preceded the recognition of the degree to which radiation induced swelling effects the positional relationship of the structural elements of the core and its support system, and accordingly, the above examples made insufficient allowance for the resulting problems.

SUMMARY OF THE INVENTION

In accordance with this invention, a relatively restricted nuclear core is achieved at operating conditions while sufficient clearance between fuel assemblies at refueling temperature is obtained through the application of metals with different coefficients of thermal expansion, careful choice of fuel assembly dimensions, clearances, spacer pad locations and the application of a temperature compensated radial restraint system.

The core of an LMFBR is generally cylindrical in shape and made-up of hexagonal fuel assemblies surrounded by similarly shaped blanket and reflector assemblies. Control rod assemblies are interspersed throughout the core. The core may be positioned between an upper and lower core support structure. The individual assemblies may also be fitted with springs to take up differential thermal expansion and keep the fuel assemblies positively positioned relative to the core support.

A typical core assembly may consist of an array of individual fuel rods surrounded by a hexagonal can having a plurality of raised spacer pads distributed along its length. The fuel assemblies are fitted with nozzles at either end. These nozzles fit into receptacles in the upper and lower core support structures and a coil take-up spring may be used at the lower end of the fuel assemblies to compensate for differential thermal expansion.

In accordance with this invention, a relatively restricted core is achieved which will allow adequate clearance upon refueling by providing a plurality of structural elements which maintain positional predictability under conditions of thermal perturbations and radiation induced swelling. The structural elements utilized include core plates of a different metal from that of the fuel assemblies such that refueling clearances are closed due to differential thermal expansion, a double lower core support plate structure which maintains the fuel assemblies in a vertical or nearly vertical position even when the upper core plate is removed, spacer pads positioned and displaced laterally from each other a predetermined amount such that the gaps are closed as the reactor approaches power, a radial restraint system utilizing relatively compliant springs with spring like back-up members strategically located outside of the active fuel zone and support columns for the upper and lower core plates which bend to allow movement of same.

DESCRIPTION OF THE DRAWINGS

For a better understanding of the invention reference may be had to the accompanying illustrative embodiment, in which:

FIG. 2 is an expanded view of the core radial restraint system of FIG. 1b; and

FIG. 3 is a cross-sectional view taken along line III—III of the restraint system of FIG. 2.

DESCRIPTION OF PREFERRED EMBODIMENT

Figure 1A:
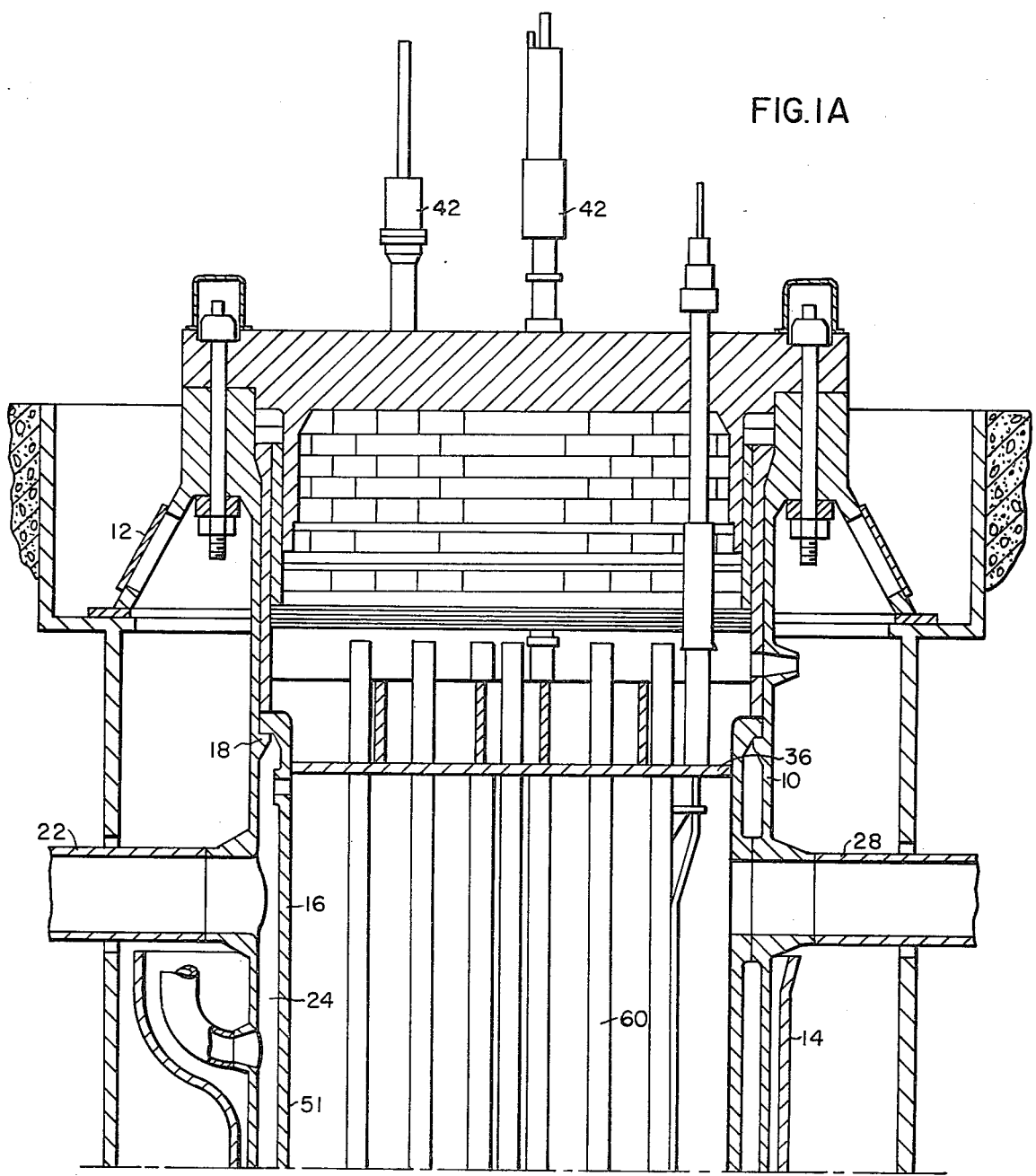
FIGS. 1a and 1b taken end-to-end, show a cross-sectional elevation view of a reactor in accordance with this invention.
Figure 1B:
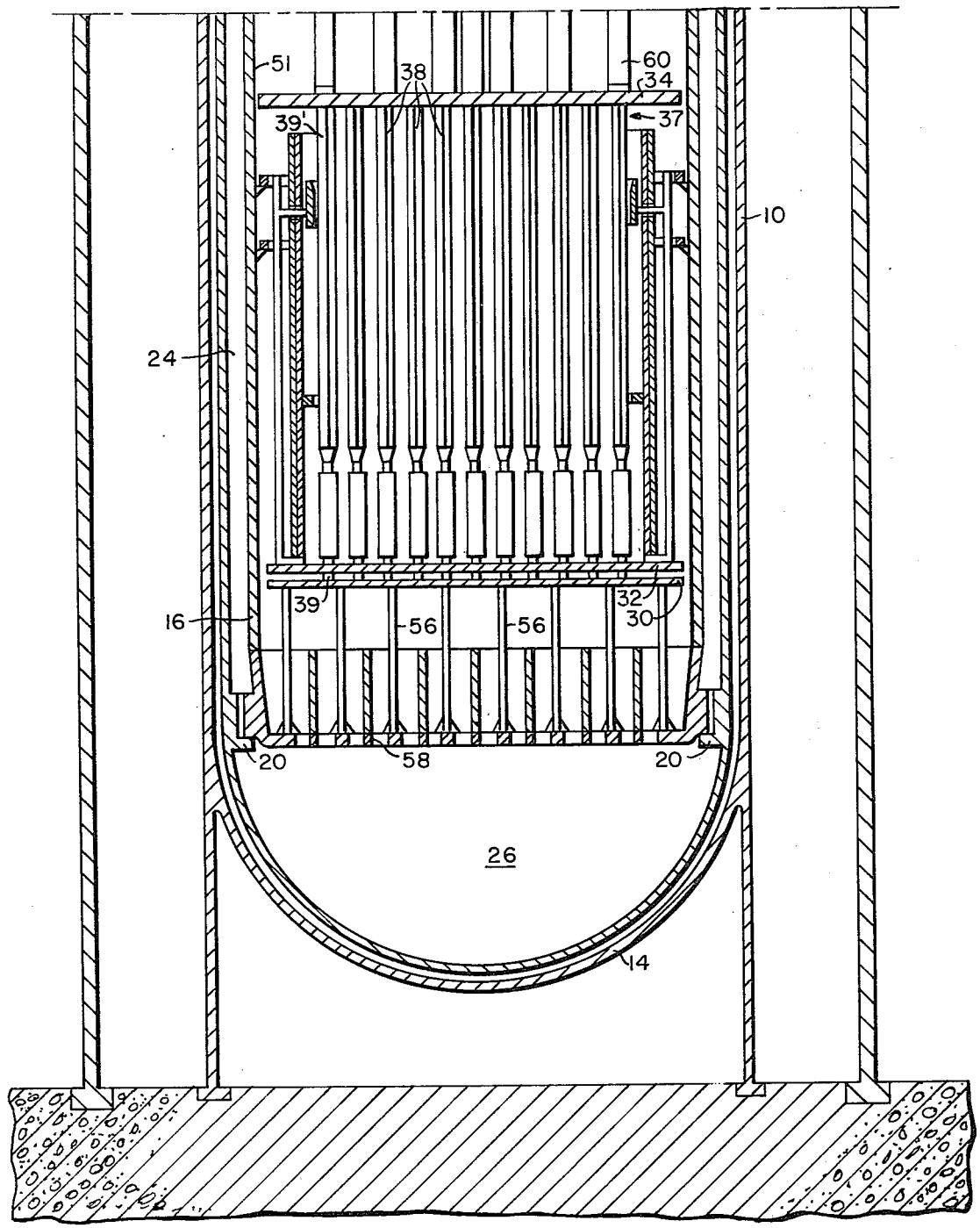

Referring to FIGS. 1a and 1b, there is shown a pressure vessel 10 supported from a skirt 12 and having a close-fitting shield vessel 14 essentially surrounding the lower portion of the pressure vessel 10. A core barrel 16 is supportedly suspended within the pressure vessel 10 from a ledge 18 near the top of the pressure vessel 10 and is additionally supported by radial key members 20 near the bottom of the pressure vessel 10.

The pressure vessel 10 includes an inlet nozzle 22 which conveys a coolant, such as liquid sodium, to an inlet annulus 24 from which the sodium is conveyed to a bottom manifold 26. An outlet nozzle 28 extends through the pressure vessel 10 and the core barrel 16 to convey the liquid sodium from the pressure vessel 10.

A number of laterally extending plates are supported within the core barrel 16. These plates include two lower core plates 30 and 32, an upper core plate 34, and an upper support plate 36.

As previously indicated, the LMFBR core 37 is generally cylindrical in shape and made up of hexagonal section fuel assemblies 38 surrounded by similarly shaped blanket and reflector assemblies. Control rod assemblies are also interspersed throughout the core and the control rods are connected to mechanisms 42 for movement with respect to the core. The fuel assemblies 38 are upwardly biased and allowed to expand. Springs 35 are provided as the lower nozzle 39 for this purpose (see FIG. 2).

In order to reduce bypass leakage of the various core assembly components and restrict lateral movement of the fuel assemblies 38, the inlet and outlet nozzles 39 and 39' of the fuel assemblies 38 are designed so as to expand to achieve a relatively close clearance with the core support plates 30, 32 and 34 when the reactor is at operating temperatures. This involves use of materials with different thermal expansion rates. Assume component fabrication at 100° F. and normal operating inlet and outlet temperatures of 750° and 1050° F. This gives a thermal expansion range of 650° for the inlet nozzles 39 and 950° for the outlet nozzles 39'. Assume that acceptable materials having the following thermal expansion rates are available:

Core Assemblies (Austenitic Stainless Steel) $8.8 \times 10^{-6}$

Lower Core Support (Nickel Alloy) $6.2 \times 10^{-6}$

Upper Core Support (Nickel Alloy) $7.8 \times 10^{-6}$

If a nominal inlet nozzle 39 with a diameter of 3.00 in. is chosen, and no "hot" clearance is desired, the design should use a clearance at 100° equal to $(8.8 - 6.2) \times 10^{-6} \times 650° \times 3.00$ inches = 0.0051 in. An outlet nozzle 39' designed under the same constraints with an O.D. of 5.00 in. would have a cold clearance equal to $(8.8 \times 7.8) \times 10^{-6} \times 950° \times 5.00$ inches = 0.0048 in. Tolerances to avoid interference of parts would increase the clearance required.

A double layered lower core support plate structure comprising plates 30 and 32 provides core lateral stability since the upper plate 32 and lower plate 30 offer two reference points to keep the various core components upright when the upper core support plate 34 has been removed. A certain amount of flexibility is desirable so adjacent assemblies 38 may be pushed aside when an individual assembly 38 is to be removed. Thus a 20:1 ratio between core plate spacing, and overall element length, combined with a nozzle diametral clearance of, for example, 0.025 in. at refueling temperature, would allow adjacent assemblies 38 to be moved approximately 0.50 in. radially from an assembly 38 which was to be replaced. Thermal expansion is thus utilized to close nozzle gaps and a layered lower core support structure is utilized to restrict movement.

The spacing between fuel, control rod, blanket, and reflector assemblies 38 is fixed at their extremities by the pitch and tolerances of the nozzle receptacle holes in the upper and lower core plates 30, 32 and 34. Thermal gradients and radiation induced swelling may cause bowing of the assemblies 38 and spacing variations along the length of the assemblies 38 with the resulting perturbation of core physics described previously. In order to minimize the amount of bowing and the corresponding gap variation, raised hard surfaced spacer pads 40 are provided at various elevations along the length of each assembly 38. These are shown on the fuel assembly 38 in FIG. 2. The pads 40 must be located outside the active core region to avoid radiation induced swelling. The gap spacing between pads represents a trade off of the various features desired. A relatively large gap would allow ease of refueling and allow more thermal and radiation induced bowing at the expense of core stability. Too small a gap would make it difficult to remove assemblies 38 for refueling.

The intent of the assembly and spacer design is to size the gaps between assemblies 38 so that they will be closed, or nearly closed by the time that the reactor reaches significant temperatures and power levels, while minimizing the amount of inward bowing that can occur during the reactor startup. The closing of these gaps is accelerated by the proper choice of materials for upper and lower core supports 30, 32 and 34. The materials must have a lower rate of thermal expansion than the material for core assemblies 38. This is particularly important in the case of the lower core supports 30 and 32 and the pads 40 below the fuel area of the assemblies as no significant temperature differential develops in this area and gap closure is accomplished only by differential thermal expansion and assembly bowing.

For example, the 100° F. gap spacing which will close to zero when the lower core plates 30 and 32 and core assemblies 38 reach a temperature of 750° F. may be determined as follows: Applying the thermal expansion rates applied previously:

$$(8.8 - 6.2) \times 10^{-6} \times 650° \times 5.75 \text{ inches} = 0.0097 \text{ in.}$$

A gap of these dimensions would be approximately half closed at refueling temperatures of 400° F.

By way of further example, the 100° F. gap spacing for pads 40 above the active core which will close to zero when the upper core plate 34 is at 100° F. and the contact pads 40 at 900° F. may be determined in a slightly more complex manner. The upper core plate 34 can be expected to operate at a higher temperature than the contact pads 40 due to temperature peaking in the individual fuel assemblies 38 which will reduce wall temperatures. Additionally, if the fuel assemblies 38 are to be kept reasonably straight, the pad location needs to be displaced only about 2/3rds as far as the upper core plate 34. Therefore, using expansion rates for components listed previously:

Core Assembly: $(8.8 \times 10^{-6} \times 800° \times 5.75 = 0.045$ in./element Core Plate: $(7.8 \times 10^{-6} \times 900° \times 5.75 = 0.0404$ in./element The differential is insignificant. The desired gap is equal to approximately 1/3rd the displacement, or 0.010 in. to 0.015 in. per element.

The reactor core described thus far is positioned first by the nozzles at either end of the various assemblies 38. The net effect of thermal and radiation induced bowing on core components is expected to be directed inward, closing contact pad gaps. However, the core must also be equipped with a peripheral restraint system 42 acting both above and below the active fuel zone. At start-up and low power levels, a restraint system 42 compliments the core assembly positioning features of the contact pads 40 and assembly end supports by limiting random outward motion, and restraining repositioned fuel assemblies 38 which would be expected to be bowed outward, if bowed at all. At higher power levels, restraint at the below core contact pads 40 restricts outward motion due to bowing in the upper sections of fuel assemblies 38. Both the above and below core restraint systems may be designed to limit core expansion due to radiation induced swelling of fuel assemblies 38 by stressing contact areas to the point where creep becomes significant.

The core restraint unit 42 (see FIGS. 2 and 3) is designed to apply restraining force through former plates 43 at the core periphery. The restraint may be applied to contact pads 40 immediately above the active core. Or, the restraint may be applied to contact pads 40 both above and below the active core 45. Beneath the active core region, a "cold" clearance should be provided between a fixed stop 47 and the outermost core assembly contact pads 40 of approximately 0.010 in.

In order to contribute effective bowing restraint at operating temperatures and power levels the restraint system 42 should be able to apply a force of 2000 lbs. per peripheral assembly 38 after a restraint displacement of 0.020 in. At the same time the restraint must have thermal expansion characteristics to match those of the lower core support structure 30 and 32 and fuel assemblies 38 which undergo a thermal expansion of approximately 0.23 in. from 100° F. to the 750° F. inlet temperature at full power operation. If the restraint system 42 is not sufficiently sensitive to the thermal expansion of the core components, it is possible to crush the outer fuel and blanket assemblies.

The restraint system 42 illustrated uses leaf, or beam type springs 44, because this configuration is relatively insensitive to thermal deformation due to temperature gradients along its length. The springs 44 may be fixed at one end 49 and have one or more intermediate supports in the region of the core restraint positions, as will be explained. As shown in FIG. 2, the restraint spring 44 is compensated for core radial thermal expansion through its mounting and support points. The mounting point may be the lower core support plate 32 or the reactor thermal liner 51. Both of these structures closely follow the reactor core inlet temperature.

Intermediate supports 54 and 56 (detailed in FIG. 2) may be designed to supplement the characteristics of the restraint spring 44. Assuming that the thermal liner 51 has a different thermal expansion coefficient than the core support plate 32, the intermediate supports 54 and 56 would be rings or relatively stiff bands. These rings would be made of material to match the thermal expansion characteristics of the core support plate 32, and be radially keyed to the vessel thermal liner 51.

In addition to serving as a close tolerance reference point for the upper end of the restraint spring 44, the primary support 54 is positioned to increase the mechanical advantage of the spring 44. The secondary support ring 56 positioned beyond normal restraint travel, will cause a significant increase in the spring constant if brought into contact. This increased force may be used to more positively restrain the core, and to promote creep, if radiation induced swelling becomes excessive in the contact areas. The location of the primary restraint 54 and secondary restraint 56 may be interchanged from that shown in the illustration in order to modify restraint characteristics. The restraining force is transferred to the former plates 43 from the restraining means 44, 54, and 56 via a load arm 57.

The core restraint unit 42 is designed to apply a radial restraining force through former plates 43 in contact with the core assembly pads 40 immediately above the active core zone. During normal operation, the fuel assembly temperature gradients are expected to provide a definite inward bowing force, so the primary requirement of the restraint is to limit outward core deflection which might be caused by previously bowed assemblies, and to provide positive restraint in case of excessive assembly swelling. The unit would be designed with a "cold" clearance of 0.010 in. The restraint spring 44 would be designed to apply approximately half the force applied by the lower core restraint 47. Core materials in this area see maximum temperatures of approximately 900° F., as described, while the thermal liner 51 on which the restraint members 54 and 56 would be mounted would not greatly exceed the maximum core inlet temperature of 750°.

A radial expansion of core assemblies 38 of 0.40 in. would be expected, but the fuel assembly gaps previously described would reduce this to a net value of approximately 0.25 in. Support rings 54 and 56 of material with the thermal expansion characteristics of the lower core support plate 32 would have the following expansion at a radius of approximately 65 in.:

$$(6.2) \times 10^{-6} \times 65 \text{ inches} \times 650° \text{ F.} = 0.262 \text{ in.}$$

Since the upper and lower core plates 30, 32 and 34 (shown in FIG. 1) are fabricated of materials having a coefficient of thermal expansion lower than the rest of the internals support structures, a problem arises in connecting components having differences in radial thermal expansion.

The lower core plate 30 may be supported by cylindrical columns 56 attached to the lower support structure 58.

The difference in radial thermal expansion between the two members 30 and 58 is taken up in bending of the columns 56 connecting the two.

In a similar manner, the upper core plate 34 is attached to tubular support columns 60 which transmit loads to the upper support plate 36. Again differences in radial thermal expansion are compensated for, by bending of the upper support columns 60.

What is claimed is:

1. In a nuclear reactor which comprises a nuclear core including a plurality of vertically oriented elongated fuel assemblies supported in a side-by-side relationship, and wherein the assemblies are supported between an upper core plate and a lower core plate and each assembly includes nozzles which are supported within openings in said core plates for laterally positioning same;

a radial restraint system surrounding said fuel assemblies for applying a constraining force to said nuclear core when said core is under operating conditions;

vertically oriented resilient members positioned adjacent the core and supported at at least one end;

load transmitting means interposed between said resilient members and the periphery of said nuclear core for transmitting resistance to displacement to said fuel assemblies as same tend to be displaced by thermal bowing and nuclear induced swelling and creep;

a first relatively stiff band surrounding said resilient members and displaced therefrom a first predetermined distance so as to increase the resistance to displacement of said resilient member and said fuel assemblies after a small displacement of same, said band being arranged and constructed to expand only a predetermined fraction of the expansion of the core upon an increase in temperature, a second relatively stiff band surrounding said resilient members and displaced a second predetermined distance from said resilient members, said second predetermined distance being greater than said first predetermined distance so as to further increase resistance to displacement as greater displacements occur.

2. In the nuclear reactor of claim 1, some of said assemblies including a plurality of fuel elements having a central active fuel region with a breeder fuel region axially adjacent each end thereof, and wherein said first relatively stiff band, said load transmitting means and said second relatively stiff band are located within the axial region defined by the breeder content of said some of said fuel elements.

3. In the nuclear reactor of claim 2, a thin walled member surrounding at least a substantial number of said fuel assemblies, spacer pads affixed to said thin walled member about the surface of same, said pad being located within the region defined by the breeder fuel content of said some of the fuel elements.

4. In the nuclear reactor of claim 3 wherein the spacer pads of each fuel assembly are arranged opposite the spacer pads of each adjacent fuel assembly, predetermined gaps being provided between each set of pads, said gaps being larger above the active fuel region.

5. In the nuclear reactor of claim 4 wherein the openings within which the nozzles are supported are larger than the nozzles under non-operating conditions, said nozzles being constructed from a material having a larger coefficient of thermal expansion than the material from which the core plates are constructed so that the space about the nozzles in the openings are closed under operating conditions.

6. In the nuclear reactor of claim 5, a plurality of flexible support members connected to each of said core plates and mounted to bend to allow for movement of said core plate attached thereto, said flexible members supporting said core plates within the reactor.

* * * * *